United States Patent [19]

Epperson et al.

[11] Patent Number: 4,608,266

[45] Date of Patent: Aug. 26, 1986

[54] PROCESS FOR FORMING A CITRUS JUICE EXTENDER

[75] Inventors: Donald E. Epperson, Chino; Orvin B. Curley, Ontario; Horton E. Swisher, Upland, all of Calif.

[73] Assignee: Brown International Corporation, Covina, Calif.

[21] Appl. No.: 700,061

[22] Filed: Feb. 11, 1985

Related U.S. Application Data

[63] Continuation of Ser. No. 499,346, May 31, 1983, abandoned.

[51] Int. Cl.$^4$ ................................................ A23L 2/02
[52] U.S. Cl. .................................. 426/599; 426/330.5; 426/489; 426/616
[58] Field of Search ............... 426/599, 651, 616, 655, 426/489, 431, 425, 330.5

[56] References Cited

U.S. PATENT DOCUMENTS

| | | | |
|---|---|---|---|
| 2,935,407 | 5/1960 | Haman | 426/616 |
| 3,037,975 | 6/1962 | Cohn | 426/599 |
| 3,112,202 | 11/1963 | Wadsworth | 426/616 |
| 3,114,641 | 12/1963 | Sperti et al. | 426/599 |

Primary Examiner—George Yeung
Attorney, Agent, or Firm—Paul A. Weilein

[57] ABSTRACT

A process for forming a citrus juice extender substantially from natural components of citrus fruit wherein flavedo from the citrus fruit is comminuted and combined with an acidifier such as citric acid and sodium citrate as a buffering agent, sufficient water being added to maintain liquidity of the combination. The combination is then finished to remove solids, the resulting liquor being pastuerized and homogenized to form the extender. The extender is stored preferably by packaging and freezing it for subsequent combination with a sweetener and a substantial amount of water to form a diluted and sweetened extender, having citrus flavoring and color as well as cloud forming agent provided by the comminuted flavedo portion of the extender, which is then blended with an initial citrus juice to form a citrus extended product.

9 Claims, 1 Drawing Figure

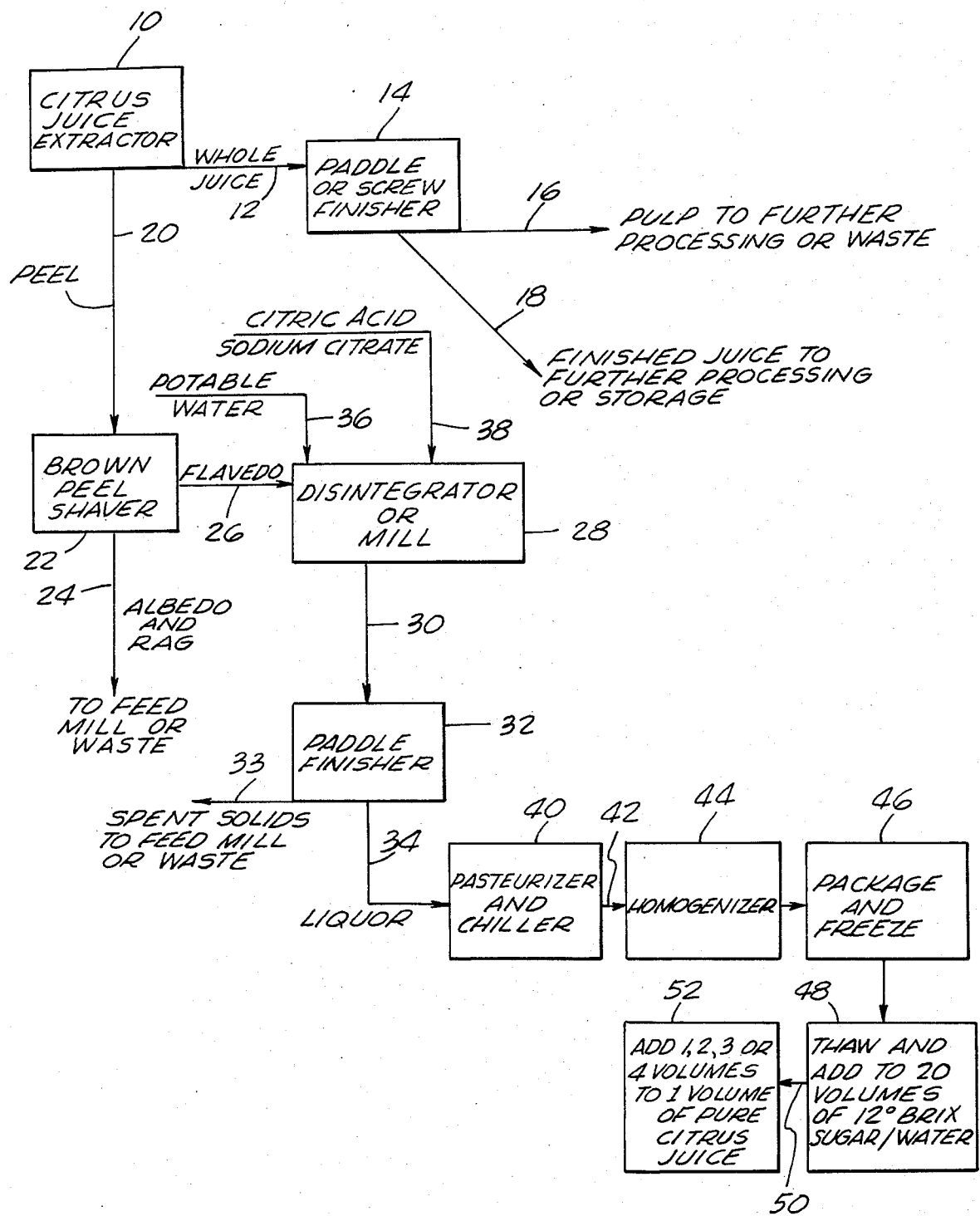

PROCESS FOR FORMING A CITRUS JUICE EXTENDER

This application is a continuation of application Ser. No. 499,346, filed May 31, 1983, now abandoned.

BACKGROUND OF THE INVENTION

The present invention relates to an extender for citrus juices and beverage products and a process for manufacturing the extender.

Substantial effort has been expended in the past to produce improved citrus juice products having improved characteristics of flavor, color and degree of cloud. Advantages in connection with flavor and color are believed obvious since it is apparent that a citrus juice or citrus flavored product will ideally have flavor and coloring closely associated with one or more citrus fruit products in order to form a more pleasing product. At the same time, extracted citrus juices commonly contain what is known as "cloud" which is generally a natural stable turbidity maintained in suspension by action of pectinous substances naturally occurring in citrus fruit. This cloud is deemed by many to impart much of the body and the flavor of fresh juice as well as desirable appearance. It is largely in the form of colloidal materials and fine or microscopic particles of solid components from the fruit. Accordingly, the characteristics of natural flavor, color and cloud enhance the resulting product and make it particularly appealing to consumers.

A number of references are described below which are believed to demonstrate the state of the prior art particularly in connection with the present invention.

Willison U.S. Pat. No. 1,848,760 dated Mar. 8, 1932 and entitled "Method of Making Pure Orange Juice Having the Desired Degree of Orange Flavor and Color" disclosed a method of making pure orange juice of desired standard as to flavor, color and purity wherein juice was first extracted from the oranges in a generally conventional fashion. The flavedo portion of the fruit rind was then peeled or shaved from the rind. The shavings were chopped into small pieces and washed in cold water to remove any bitter principal present from any albedo portion removed with the flavedo shavings. The chopped and washed flavedo shavings were then added to the juice to adjust the color and flavor of the juice.

Hill U.S. Pat. No. 2,086,911 dated July 13, 1937 and entitled "Treatment of Whole Citrus Fruit" disclosed a process for forming a beverage base or citrus juice product wherein whole citrus fruits were shredded in an auger or screw-type shredding machine so that the fruit was shredded in a plurality of substantially parallel planes extending transversely through the fruit. The patent further disclosed that fibrous membrane and albedo, containing undesirable bitter substances, could then be removed to leave the juice component along with oils from the flavedo layer of the rind to enhance the flavor of the juice.

Haman U.S. Pat. No. 2,935,407 dated May 3, 1960 and entitled "Process of Preserving the Fresh Flavor of Citrus Fruits" disclosed a process for preserving the fresh flavor of whole citrus fruit and producing a "creamed whole citrus fruit preparation" wherein all the fresh flavor of the citrus fruit was retained in refrigerated storage for a normal use period. Like Hill, Haman contemplated initially macerating whole citrus fruits except for the seeds which were the only portion of the fruit removed from the product. Haman then homogenized the macerated whole citrus fruit to produce the final desired product.

Villadsen U.S. Pat. No. 3,404,990 dated Oct. 8, 1968 and entitled "Preparation of Clouding and Coloring Agent for Soft Drinks" disclosed yet another process for preparing citrus fruit juices and other juices into beverages such as soft drinks, lemonade, and the like. This patent contemplated the use of desirable cloud forming and coloring agents from the peels and rag of the fruits in order to enhance a juice recovered from the citrus fruit. The patent further described treatment of the peel and rag from the fruit, for example, by heating or enzymatic action, to better condition the cloud forming and coloring agents obtained from the citrus fruit. The patent also indicated that these cloud forming and coloring agents could be used either in combination with juice from the same fruit or other beverages such as soft drinks and the like.

Finally, Douglas U.S. Pat. No. 3,647,475 dated Mar. 7, 1972 and entitled "Cloud Fortified Citrus Fruit Juices", assigned to the assignee of the present invention, disclosed a citrus juice product and method of formation wherein a quantity of finely divided albedo, or inner white layer of the rind or peel of the citrus fruit, after removal of the outer flavedo layer, was incorporated into an extracted citrus fruit juice. This combination fortified the cloud color of the resultant juice while also increasing its vitamin C content.

Accordingly, the prior art demonstrates a substantial variety of techniques for enhancing citrus juices and related beverage products. However, it will be apparent that most of these efforts have been directed toward enhancement of beverage products through the addition of one or more components from the citrus fruit itself directly into the juice with the juice then being in a form suitable for consumption by the end user.

However, there has been found to remain a substantial need for improved citrus juice products and method of manufacturing them for enhancing both natural color and flavor while at the same time making these products economically more feasible by dilution with less costly ingredients, particularly for mass markets.

SUMMARY OF THE INVENTION

Accordingly, it is an object of the present invention to provide a natural citrus juice extender and process of manufacture in order to realize certain of the advantages summarized above.

More particularly, it is an object of the invention to provide such a natural citrus juice extender and method of manufacture wherein the extender serves to enhance the natural color, flavor and cloud of the resulting extended juice product while at the same time making the extended juice product particularly economical for manufacture and distribution.

In view of the objects summarized above, it is particularly contemplated by the present invention to provide a process for forming a citrus juice extender substantially from natural components of a selected citrus fruit. More particularly, the invention contemplates comminution of a flavedo portion from the selected citrus fruit and combination of the comminuted flavedo with an acidifier such as citric acid and sodium citrate as a buffering agent, sufficient water being added to maintain liquidity of the combination. The combination is finished to remove solids and form a resulting liquor which is then preferably pasteurized and/or homogenized to enhance the storage life and cloud stability of the extender.

The invention particularly contemplates that the extender may be stored for subsequent combination with a sweetener and a substantial amount of water to form a diluted and sweetened extender which may then be blended with a citrus juice to form an extended juice or beverage product.

The combination of an acidifier such as citric acid with the extender is important for enhancing the flavor of the juice product formed by combination of the initial juice, sweetener and water. The citric acid combines with the sweetener and water to provide, in final diluted form, the same natural flavor properties as the initial juice. The major flavor properties of concern here include sweetness, aroma, color and flavor as well as acidity. According to the present invention, these properties which are present in the initial juice are naturally enhanced in the extended juice product by the sweetener, the comminuted flavedo and the acidifier or citric acid. Thus, the invention permits the initial citrus juice to be greatly diluted while maintaining the natural flavor and other natural properties of the initial juice.

Sodium citrate is preferably added as a buffering agent for the citric acid to further improve natural flavor of the extended juice product. Potassium citrate may be substituted for sodium citrate where a low sodium end product is desired.

From the preceding summary, it will be apparent that the invention particularly contemplates a citrus juice extender which is adapted for blending with an initial citrus juice, together with a sweetener and potable water, to extend the total volume of the initial citrus juice. The initial citrus juice may be obtained from the same citrus fruit as the flavedo portion of the extender or it can be obtained from citrus fruit different from the fruit from which the flavedo portion is obtained. Numerous variations are also discussed below in connection with the invention. For example, the citrus juice extender may also be blended with other juices or beverages besides initial citrus juice. For example, the citrus juice extender could also be used in combination with soft drinks or the like to similarly form citrus extended juices or beverages having characteristics of natural color, flavor and cloud in accordance with the selected citrus fruit used to obtain the flavedo portion of the extender.

It is also noted in connection with the present invention that the term "initial citrus juice" is used to signify citrus juice which is obtained as an initial extract from the citrus fruit by customary juice extraction processes for that fruit. Such initial juices may also be cloud fortified in themsleves, or concentrated, or reconstituted or blended in usual manners as are well known in the prior art.

In any event, additional objects and advantages of the present invention are set forth in the following description having reference to the accompanying drawing.

BRIEF DESCRIPTION OF THE DRAWING

The single drawing illustrates a flow sheet outlining a specific process for forming a citrus juice extender in accordance with the present invention.

DESCRIPTION OF THE PREFERRED EMBODIMENT

As noted above, the present invention relates to a citrus juice extender adapted for storage over extended periods of time and for economical subsequent formation of an extended juice product by combination of the extender with an initial citrus juice or the like. It is noted in particular that the following process makes specific reference to formation of a citrus juice extender with flavedo obtained from oranges. The specific embodiment further contemplates that the extender is subsequently adapted for combination with an initial citrus juice also in the form of orange juice. However, the following description is also contemplated for other citrus fruits or even combinations of such citrus fruits in generally similar proportions and with the steps of the invention otherwise remaining the same.

As shown in the drawing, any citrus juice such as lemon, orange, grapefruit, tangerine, or lime, for example, may be extracted from the corresponding citrus fruit in any conventional or preferred juice extraction apparatus 10. Initial or single strength juice flows from the extractor through a pipeline 12 to a finisher 14 which may, for example, be of either a paddle or screw type for conventionally removing solids from the initial juice. Solids extracted from the juice are discarded from the present process as indicated at 16 but may be useful for another purpose. The initial finished juice from the finisher 14 is recovered as indicated at 18 and provides a preferred base for combination with the extender of the present invention as described in greater detail below.

Peel from the citrus fruit is also recovered from the extractor 10 as indicated at 20 and passed to a conventional shaver 22. Shavers such as that indicated at 22 are well known in the prior art for removing the flavedo portion of the rind from its albedo or white portion. As indicated above, it is desirable to recover substantially only the flavedo portion since it includes flavoring oils, coloring and cloud forming agent natural to the particular variety of citrus fruit supplied to the extractor 10. The albedo portion of the rind and any remaining rag pass from the shaver, as indicated at 24, and are discarded for purposes of the invention, but may be useful for other purposes. The flavedo portion of the rind is passed through a conduit 26 to a generally conventional disintegrator or mill 28. The disintegrator 28 includes grinding means or chopping means or any other form of disintegrating or macerating means suitable for finely dividing or comminuting the flavedo into a form which can be placed in colloidal suspension in the extender as described in greater detail below.

In order to facilitate handling of the liquor and its proper conditioning within the finisher 32, water is added to the flavedo in the disintegrator 28 as indicated at 36. The amount of water added at 36 to the disintegrator 28 is generally just sufficient to maintain a desired liquid consistency for the liquor passing from the finisher 32 through the outlet 34. At the same time, an acidifier and chelating agent such as citric acid and sodium citrate as a buffering agent are also preferably added to the disintegrator as indicated at 38.

The comminuted flavedo passes from the disintegrator 28 through a conduit 30 to a finisher 32 which is also of generally conventional construction for removing substantially all solids or materials from the comminuted flavedo which is coarser than the indicated colloidal or microscopic size particles suitable for suspension within the extender of the present invention.

Solids are removed from the finisher 32 through a conduit 33 and are also discarded from further use in the present invention but may be used for other purposes. Thus, a finished liquor is recovered from the finisher in an outlet 34.

Accordingly, the liquor passing through the outlet 34 includes colloidal sized particles, color pigment, oils, various flavor constituents and other components of the flavedo along with water and the citric acid and sodium citrate.

The above combination preferably forms the extender of the invention. However, it is particularly contemplated that the extender be further conditioned in order to adapt it for storage and possible transport as particularly contemplated by the invention. The liquor from the outlet 34 is passed to a pasteurizer 40 which is also of conventional design for pasteurizing and chilling the liquor which then passes through a pipeline 42 to a homogenizer 44 which is again of conventional construction and operation for reducing any oils or other colloidal material from the flavedo for suspension within the liquefied extender.

The extender is then stored as indicated at 46 for subsequent use in a manner described in greater detail below to form a citrus extended juice product. Preferably. the extender is packaged and frozen at 46 to adapt it for storage over possibly long periods of time and also to better adapt the extender for possible transport to an end-use site. In this manner, the invention particularly contemplates a process which is especially economical for producing the citrus extended juice product referred to above.

In forming the citrus extended juice product, the extender from the storage point 46 is conveyed to a processing stage 48 where the extender is thawed and combined with a mixture of water and sweetener. The sweetener may be of any type, preferably a sugar or the like. The relative amounts of water and sugar are widely variable within the scope of the present invention. However, it is particularly contemplated that the water and sweetener be combined to a concentration in the range of about 5° to 15° BRIX and more particularly to form a concentration of about 12° BRIX.

Once again, the amount of the water and sugar mixture to be combined with the extender at the processing point 48 is also widely variable according to the present invention. However, it is generally contemplated that 1 volume of extender may be combined with as much as 25 volumes of the solution of water and sweetener. Where the water and sweetener are combined to a concentration of about 12° BRIX, it is even more preferably contemplated that about 1 volume of extender is combined with approximately 20 volumes of the 12° BRIX solution of water and sweetener to form about 21 volumes of diluted and sweetened extender.

The diluted and sweetened extender from the processing point 48 is then conveyed through a conduit 50 to an additional processing point 52 which is contemplated as being the point of consumption for the citrus extended juice product resulting from the present invention. At this point, the diluted and sweetened extender from the conduit 50 is combined with the initial juice recovered at 18. Here again, the proportions between these two materials may vary widely according to the present invention. Generally, 1 volume of beverage base or initial juice is to be blended with at least about 1 volume of the diluted and sweetened extender. More preferably, where 20 volumes of 12° BRIX water and sweetener solution are combined with 1 volume of extender at 48, approximately 1 volume of the initial juice is blended at 52 with from 1 to 4 volumes of the diluted and sweetened extender. This provides a drink containing the proper level of natural citrus oil desirable in initial citrus juice.

As noted above, the juice may be other than initial citrus juice. For example, a beverage such as a soft drink or the like could be combined with the extender, sweetener and water to form the citrus extended juice product. However, the invention preferably contemplates an intial citrus juice which need not be obtained from the kind or variety of citrus fruit from which the flavedo portion of the extender is obtained, but may indeed be an initial juice obtained from citrus fruit of a different kind or variety. For example, the flavedo portion of the extender may be obtained from navel oranges and added to juice obtained from valencia oranges in order to obtain a desired blend.

In a particular example for forming the extender of the present invention, the following weights are particularly recited in connection with extraction of the flavedo portion and the initial juice for oranges. However, the following example may also be taken in conjunction with other citrus fruits as described above. Also, the extender resulting from the following example may be combined with initial juice from the same citrus fruit as described below or with initial juice obtained from a different variety. It may even be combined with initial juice from other citrus fruits or with other beverage bases such as soft drinks or the like.

In a preferred example, a quantity of selected fruit such as 2,000 parts by weight of oranges is extracted at room temperature in the exterior 10 to yield about 1,050 parts by weight of whole juice mixture passing through the pipeline 12 to the finisher 14, the remaining 950 parts being in the form of peel passing at 20 to the shaver 22. In the finisher 14, approximately 100 parts by weight of additional rag or pulp and seeds are removed to form about 950 parts by weight of finished juice at 18. The relative weight of the finished juice at 18 as compared to the weight described below for the extender of the present invention is not of particular importance.

Referring to the shaver 22, from the 950 parts of peel, approximately 350 parts of flavedo are passed to the disintegrator 28. Approximately 730 parts by weight of potable water are added to the disintegrator at 36 while approximately 23 parts by weight of citric acid and 8 parts by weight of sodium citrate are added at 38 to the disintegrator. With this mixture being passed to the finisher 32, approximately 222 parts by weight of solids are removed at 33 with the remainder forming the liquor in the outlet 34 which passes through the pasteurizer and chiller 40, the homogenizer 44 and the storage point 46 as described in greater detail above.

At the processing point 48, approximately 1 volume of thawed extender from the storage point 46 is then combined with 20 volumes of approximately 12° BRIX concentration of sweetener and water to form approximately 21 volumes of diluted and sweetened extender at 50. In final use, as indicated at 52, approximately 1 volume of initial citrus juice is then combined with from 1 to 4 volumes of the diluted and sweetened extender. The actual volume of diluted and sweetened extender to be added at 52 depends, of course, upon the degree of flavor, color and cloud desired in the final juice product. At the same time, it will be readily apparent that the economics of the final juice product are greatly enhanced by the concentrated form of the extender at the storage point 46 as well as by the rates of addition at both the processing points 48 and 52 according to the present invention.

Accordingly, there has been described a particularly effective process for forming a citrus extender for juice products. Numerous variations and modifications will be apparent from the preceding description. Accordingly, the scope of the invention is defined only by the following appended claims.

What is claimed is:

1. A process for forming a citrus extender substantially from natural components of citrus fruit, comprising the steps of:

separating flavedo from the peel of the citrus fruit by shaving in order to assure recovery and separation of the desirable components of the flavedo from the albedo, pulp and other components of the citrus fruit in order to recover substantially all of its essential oil, color and cloud-forming components from the flavedo.

comminuting the flavedo into particles suitable for being placed in colloidal suspension, combining the comminuted flavedo with an acidifying agent and with a minimum amount of water just sufficient to maintain liquidity of the combination, finishing the combination to remove solids and form a resultant finished liquor extender containing substantially all available essential oil, color and cloud forming components of the comminuted flavedo for enhancing natural color, flavor and cloud of a subsequently extended juice product, and storing the extender for subsequent combination with a sweetener and water to thereupon form a diluted and sweetened extender suitable for blending with an initial juice to form a citrus extended juice product.

2. The process of claim 1 wherein the juice is extracted from the citrus fruit prior to separation and recovery of the flavedo.

3. The process of claim 1 wherein said extender is combined with the sweetener and water at a point of use for the citrus extended juice product.

4. The process of claim 1 further comprising the step of pasteurizing and/or homogenizing the finished liquor extender to better adapt it for storage and subsequent combination.

5. The process of claim 1 wherein one volume of the extender is combined with up to approximately 25 volumes of a solution of water and sweetener with a concentration in the range of about 5° to 15° Brix to form the diluted and sweetened extender.

6. The process of claim 1 wherein one volume of initial citrus juice is blended with at least about one volume of the diluted and sweetened extender.

7. The process of claim 6 wherein one volume of extender is combined with approximately 20 volumes of about 12° Brix solution of water and sweetener to form about 21 volumes of the diluted and sweetened extender.

8. The process of claim 7 wherein one volume of initial citrus juice is blended with about 1 to 4 volumes of the diluted and sweetened extender.

9. The process of claim 8 wherein the extender is packaged and frozen for storage and transport to a point of use, the extender thereafter being combined with sweetener and water to form the diluted and sweetened extender for blending with initial citrus juice.

* * * * *

UNITED STATES PATENT AND TRADEMARK OFFICE
CERTIFICATE OF CORRECTION

PATENT NO. : 4,608,266
DATED : August 26, 1986
INVENTOR(S) : Donald E. Epperson et al It is certified that error appears in the above-identified patent and that said Letters Patent are hereby corrected as shown below:

Column 6, line 36, "exterior" should read --extractor--.

Signed and Sealed this

Fourth Day of November, 1986

[SEAL]

Attest:

DONALD J. QUIGG

*Attesting Officer*  *Commissioner of Patents and Trademarks*